(12) United States Patent
Tobe et al.

(10) Patent No.: US 11,597,400 B2
(45) Date of Patent: Mar. 7, 2023

(54) VEHICLE CONTROL APPARATUS, VEHICLE, AND VEHICLE CONTROL METHOD

(71) Applicant: HONDA MOTOR CO., LTD., Tokyo (JP)

(72) Inventors: Takuya Tobe, Wako (JP); Yoshifumi Nakamura, Wako (JP); Shinya Uno, Wako (JP); Kentaro Ishisaka, Wako (JP); Ayumu Horiba, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 126 days.

(21) Appl. No.: 17/191,116

(22) Filed: Mar. 3, 2021

(65) Prior Publication Data

US 2021/0276580 A1 Sep. 9, 2021

(30) Foreign Application Priority Data

Mar. 5, 2020 (JP) .............................. JP2020-037341

(51) Int. Cl.
  *B60W 50/08* (2020.01)
  *B60W 30/09* (2012.01)
  (Continued)

(52) U.S. Cl.
  CPC ......... *B60W 50/085* (2013.01); *B60R 22/195* (2013.01); *B60W 30/09* (2013.01);
  (Continued)

(58) Field of Classification Search
  CPC .. B60W 50/085; B60W 30/09; B60W 30/143; B60W 50/082; B60W 50/087;
  (Continued)

(56) References Cited

U.S. PATENT DOCUMENTS 6,401,024 B1 * 6/2002 Tange ................... B60W 30/16
                                                              180/170
7,840,354 B2 * 11/2010 Knoop ....................... B60T 7/22
                                                              701/301

(Continued)

FOREIGN PATENT DOCUMENTS

CN          106882186 A    *  6/2017
JP        2000-355232 A      12/2000
              (Continued)

OTHER PUBLICATIONS

CN-106882186-A translation (Year: 2017).*

(Continued)

*Primary Examiner* — Jeff A Burke
*Assistant Examiner* — Kyle T Johnson
(74) *Attorney, Agent, or Firm* — Carrier Shende & Associates, P.C.; Joseph P. Carrier; Jeffrey T. Gedeon

(57) ABSTRACT

A vehicle control apparatus, which controls a vehicle having a plurality of driving modes, includes a travel control section that performs travel control of the vehicle based on vicinity information; a limit value determining section that determines a deceleration limit value used when the travel control is performed, according to the driving mode; and a braking control section that performs braking control based on the vicinity information, such that the vehicle decelerates with a deceleration that does not exceed the determined deceleration limit value; wherein the limit value determining section sets the deceleration limit value to a first limit value when the vehicle is driven in a first driving mode, and sets the deceleration limit value to a second limit value higher than the first limit value, when the vehicle is driven in a second driving mode that has a higher degree of automation than the first driving mode.

10 Claims, 9 Drawing Sheets

(51) Int. Cl.
*B60R 22/195* (2006.01)
*B60W 30/14* (2006.01)

(52) U.S. Cl.
CPC ........ *B60W 30/143* (2013.01); *B60W 50/082* (2013.01); *B60W 50/087* (2013.01); *B60W 2520/105* (2013.01)

(58) Field of Classification Search
CPC ....... B60W 2520/105; B60W 2520/10; B60W 2720/106; B60W 30/18109; B60W 50/14; B60W 60/0015; B60W 60/0053; B60W 60/0059; B60W 30/182; B60W 60/005; B60R 22/195; B60T 2201/022; B60T 7/22; B60T 7/12
See application file for complete search history.

(56) References Cited

U.S. PATENT DOCUMENTS

| | | | |
|---|---|---|---|
| 10,967,877 B2 | 4/2021 | Asakura et al. | |
| 2005/0168328 A1* | 8/2005 | Kitterer | B60K 31/0008 340/435 |
| 2006/0195231 A1* | 8/2006 | Diebold | B60R 21/013 701/1 |
| 2007/0032952 A1* | 2/2007 | Carlstedt | B60T 7/22 701/45 |
| 2007/0109110 A1 | 5/2007 | Ohmura et al. | |
| 2009/0319148 A1 | 12/2009 | Kubo et al. | |
| 2010/0256852 A1* | 10/2010 | Mudalige | G08G 1/164 701/24 |
| 2014/0336908 A1* | 11/2014 | Mori | F02D 17/00 701/112 |
| 2018/0127001 A1* | 5/2018 | Ricci | B60W 50/14 |
| 2019/0235510 A1* | 8/2019 | Hashimoto | B60W 30/182 |

FOREIGN PATENT DOCUMENTS

| | | |
|---|---|---|
| JP | 2007137126 A | 6/2007 |
| JP | 2010-000851 A | 1/2010 |
| WO | 2017/179193 A1 | 10/2017 |

OTHER PUBLICATIONS

Office Action dated Dec. 21, 2021 issued over the corresponding Japanese Patent Application No. 2020-037341 with the English translation thereof.

\* cited by examiner

FIG. 2

| DRIVING MODE | SUBJECT PERFORMING DRIVING MANIPULATION | MONITORING RESPONSIBILITY | DRIVING MANIPULATION PREPARATION | COMMENTS |
|---|---|---|---|---|
| FIRST DRIVING MODE L2A | DRIVER & SYSTEM | YES | NECESSARY | |
| SECOND DRIVING MODE L2B | DRIVER & SYSTEM | YES | UNNECESSARY | |
| THIRD DRIVING MODE L3 | SYSTEM | NO | UNNECESSARY | CONSTANT-VELOCITY TRAVEL IN TRAFFIC JAM ETC. |

FIG. 4

| DRIVING MODE | VELOCITY | DECELERATION LIMIT VALUE | REFERENCE EXAMPLE |
|---|---|---|---|
| FIRST DRIVING MODE L2A | 0~135km/h | 0.6G (FIRST LIMIT VALUE) | 0.6G |
| SECOND DRIVING MODE L2B (LOW-VELOCITY VEHICLE) | 0~50km/h | 1.0G (SECOND LIMIT VALUE) | 0.6G |
| SECOND DRIVING MODE L2B (HIGH-VELOCITY VEHICLE) | 60~120km/h | 0.3G (FOURTH LIMIT VALUE) | 0.3G |
| THIRD DRIVING MODE L3 | 0~50km/h | 1.0G (THIRD LIMIT VALUE) | 0.6G |

VEHICLE CONTROL APPARATUS, VEHICLE, AND VEHICLE CONTROL METHOD

CROSS-REFERENCE TO RELATED APPLICATION

This application is based upon and claims the benefit of priority from Japanese Patent Application No. 2020-037341 filed on Mar. 5, 2020, the contents of which are incorporated herein by reference.

BACKGROUND OF THE INVENTION

Field of the Invention

The present invention relates to a vehicle control apparatus, a vehicle, and a vehicle control method.

Description of the Related Art

Japanese Laid-Open Patent Publication No. 2010-000851 discloses operating a brake control section when a decrease in an accelerator manipulation amount or the accelerator turning OFF is detected by an accelerator state detecting section and a deceleration target in the road being traveled is detected by a travel road situation detecting section.

SUMMARY OF THE INVENTION

However, in Japanese Laid-Open Patent Publication No. 2010-000851, even though a limiter is used to limit the deceleration to a target deceleration in order to avoid sudden deceleration, this limiter is set uniformly, making it unsuitable for braking control in various driving modes.

The present invention has the object of providing a vehicle control apparatus, a vehicle, and a vehicle control method that can realize more accurate braking control according to the driving mode.

A vehicle control apparatus according to an aspect of the present invention is a vehicle control apparatus that controls a vehicle having a plurality of driving modes and includes a vicinity information acquiring section that acquires vicinity information of the vehicle; a travel control section that performs travel control of the vehicle based on the vicinity information; a limit value determining section that determines a deceleration limit value, which is a limit value for deceleration when the travel control is performed, according to the driving mode; and a braking control section that performs braking control based on the vicinity information, such that the vehicle decelerates with a deceleration that does not exceed the determined deceleration limit value; wherein the limit value determining section sets the deceleration limit value to a first limit value when the vehicle is driven in a first driving mode among the plurality of driving modes, and sets the deceleration limit value to a second limit value, which is higher than the first limit value, when the vehicle is driven in a second driving mode that has a higher degree of automation than the first driving mode.

A vehicle according to another aspect of the present invention includes the vehicle control apparatus described above.

A vehicle control method according to yet another aspect of the present invention is a vehicle control method for controlling a vehicle that has a plurality of driving modes, including a travel control step of performing travel control of the vehicle based on vicinity information; a limit value determining step of determining a deceleration limit value, which is a limit value for deceleration when the travel control is performed, according to the driving mode; and a braking step of performing braking control based on the vicinity information, such that the vehicle decelerates with a deceleration that does not exceed the deceleration limit value determined in the limit value determining step; wherein, in the limit value determining step, the deceleration limit value is set to a first limit value when the vehicle is driven in a first driving mode among the plurality of driving modes, and the deceleration limit value is set to a second limit value, which is higher than the first limit value, when the vehicle is driven in a second driving mode that has a higher degree of automation than the first driving mode.

According to the present invention, it is possible to provide a vehicle control apparatus, a vehicle, and a vehicle control method that can realize more accurate braking control according to the driving mode. More specifically, according to the present embodiment, since the deceleration limit value is more relaxed in driving modes having a high degree of automation, it is possible to increases cases where it is possible to avoid a collision in a driving mode with a high degree of automation.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a diagram showing each automated driving level;

FIG. 4 is a diagram showing examples of a deceleration limit values;

DESCRIPTION OF THE PREFERRED EMBODIMENTS

Preferred embodiments of a vehicle control apparatus, a vehicle, and a vehicle control method according to the present invention will be presented and described below, with reference to the accompanying drawings.

Embodiment

Figure 1:
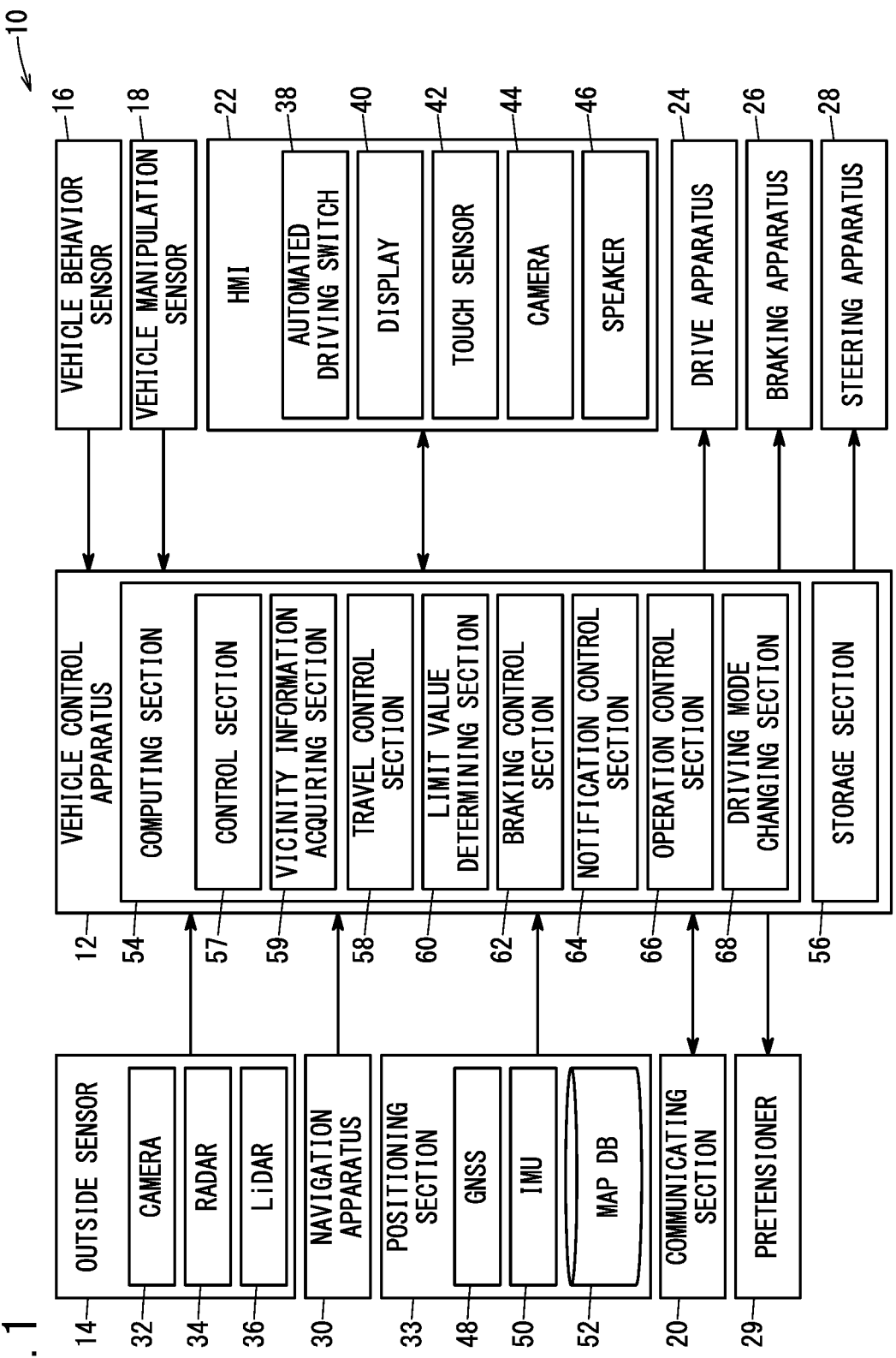
FIG. 1 is a block diagram showing a vehicle that includes a vehicle control apparatus according to an embodiment.

A vehicle control apparatus, a vehicle, and a vehicle control method according to an embodiment will be described using FIGS. 1 to 9. FIG. 1 is a block diagram showing a vehicle including the vehicle control apparatus according to the present embodiment.

A vehicle (user vehicle) 10 includes a vehicle control apparatus 12, i.e., a vehicle control ECU (Electronic Control Unit). The vehicle 10 further includes an outside sensor 14, a vehicle behavior sensor 16, a vehicle manipulation sensor 18, a communicating section 20, and an HMI (Human-Machine Interface) 22. The vehicle 10 also includes a drive apparatus 24, a braking apparatus 26, a steering apparatus 28, a pretensioner 29, a navigation apparatus 30, and a positioning section 33.

The outside sensor 14 acquires outside information, which is information concerning the area around the vehicle 10. The outside sensor 14 includes a plurality of cameras 32 and a plurality of radars 34. The outside sensor 14 also includes a plurality of LiDARs (Light Detection And Ranging, Laser Imaging Detection and Ranging) 36.

The information acquired by the cameras (imaging section) 32, i.e., camera information, is supplied from the cameras 32 to the vehicle control apparatus 12. The camera information is captured image information, for example. The camera information forms outside information, together with the radar information and LiDAR information described further below. In FIG. 1, only one camera 32 is shown, but a plurality of cameras 32 are actually included.

Each radar 34 emits a transmission wave toward the outside of the vehicle 10, and receives a reflected wave that comes back to the radar 34 when a portion of the emitted transmission wave is reflected by a detection object. The transmission wave may be an electromagnetic wave or the like, for example. The electromagnetic wave is a millimeter wave or the like, for example. The detection object is another vehicle or the like, including a preceding vehicle 70, for example. The radar 34 generates radar information (reflected wave signal) based on the reflected wave or the like. The radar 34 supplies the generated radar information to the vehicle control apparatus 12. In FIG. 1, one radar 34 is shown, but a plurality of radars 34 are actually included in the vehicle 10. The radars 34 are not limited to being millimeter wave radars. As an example, ultrasonic sensors or the like may be used as the radars 34.

Each LiDAR 36 continuously emits a laser in all directions from the vehicle 10, measures the three-dimensional position of a reflection point based on reflected waves resulting from the emitted laser, and outputs information concerning this three-dimensional position, i.e., three-dimensional information. The LiDAR 36 supplies this three-dimensional information, i.e., LiDAR information, to the vehicle control apparatus 12. In FIG. 1, one LiDAR 36 is shown, but a plurality of LiDARs 36 are actually included in the vehicle 10.

The vehicle behavior sensor 16 acquires information concerning the behavior of the vehicle 10, i.e., vehicle behavior information. The vehicle behavior sensor 16 includes a vehicle velocity sensor (not shown in the drawings), a wheel velocity sensor (not shown in the drawings), an acceleration sensor (not shown in the drawings), and a yaw rate sensor (not shown in the drawings). The vehicle velocity sensor detects the travel velocity of the vehicle 10, i.e., the vehicle velocity. Furthermore, the vehicle velocity sensor detects the progression direction of the vehicle 10. The wheel velocity sensor detects the velocity of the vehicle wheels (not shown in the drawings), i.e., the wheel velocity. The acceleration sensor detects the acceleration of the vehicle 10. The acceleration includes the forward-rear acceleration, the lateral acceleration, and the up-down acceleration. It is acceptable for acceleration in only some of these directions to be detected by the acceleration sensor. The yaw rate sensor detects the yaw rate of the vehicle 10.

The vehicle manipulation sensor (driving manipulation sensor) 18 acquires information concerning driving manipulations made by a user (driver), i.e., driving manipulation information. The vehicle manipulation sensor 18 includes an acceleration pedal sensor (not shown in the drawings), a brake pedal sensor (not shown in the drawings), a steering angle sensor (not shown in the drawings), and a steering torque sensor (not shown in the drawings). The acceleration pedal sensor detects the manipulation amount of an acceleration pedal (not shown in the drawings). The brake pedal sensor detects the manipulation amount of a brake pedal (not shown in the drawings). The steering angle sensor detects the steering angle of a steering wheel (not shown in the drawings). The steering torque sensor detects the torque applied to the steering wheel.

The communicating section 20 performs wireless communication with an external device (not shown in the drawings). The external device can include an external server or the like (not shown in the drawings), for example.

The HMI 22 receives the manipulation input made by a user (occupant), and visually, audibly, or tactilely provides the user with various types of information. The HMI 22 includes an automated driving switch (driving assistance switch) 38, a display 40, a touch sensor 42, a camera 44, and a speaker 46.

The automated driving switch 38 is a switch with which the user issues instructions to start and stop automated driving. The automated driving can be following travel, which causes the vehicle 10 to follow the preceding vehicle 70, or the like, for example, but is not limited to this. The automated driving switch 38 includes a start switch (not shown in the drawings) and an end switch (not shown in the drawings). The start switch outputs a start signal to the vehicle control apparatus 12, in response to a manipulation by the user. The end switch outputs an end signal to the vehicle control apparatus 12, in response to a manipulation by the user.

The display (display section) 40 can present a prescribed display. The display 40 can be a liquid crystal display, organic EL display, or the like, for example, but is not limited to this. Here, an example is described of a case in which the display 40 is a touch screen, but the display 40 is not limited to this.

The touch sensor 42 detects whether the user (driver) is touching the steering handle. A signal output from the touch sensor 42 is supplied to the vehicle control apparatus 12. The vehicle control apparatus 12 can determine whether the user is touching the steering handle based on the signal supplied from the touch sensor 42.

The camera 44 captures an image of the inside of the vehicle 10, i.e., the inside of the vehicle cabin (not shown in the drawings). The camera 44 may be provided on the dashboard (not shown in the drawings) or on the ceiling (not shown in the drawings), for example. Furthermore, the camera 44 may be provided to capture an image of only the driver, or may be provided to capture an image of each occupant. The camera 44 outputs information acquired by capturing the image inside the vehicle cabin, i.e., image information, to the vehicle control apparatus 12.

The speaker (notifying section) 46 provides the user with various types of information using sound. The vehicle control apparatus 12 outputs various notifications, warnings, and the like using the speaker 46.

The drive apparatus (drive force control system) 24 includes a drive ECU (not shown in the drawings) and a drive source (not shown in the drawings). The drive ECU controls the drive force (torque) of the vehicle 10 by controlling the drive source. The drive source can be an engine, a drive motor, or the like, for example. The drive ECU can control the drive force by controlling the drive source, based on manipulation of the acceleration pedal performed by the user. Furthermore, the drive ECU can control the drive force by controlling the drive source based on instructions supplied from the vehicle control apparatus 12. The drive force of the drive source is transmitted to the vehicle wheels (not shown in the drawings) via a transmission or the like (not shown in the drawings).

The braking apparatus (braking force control system) 26 includes a braking ECU (not shown in the drawings) and a braking mechanism (not shown in the drawings). The braking mechanism causes a braking member to operate using a brake motor, hydraulic mechanism, or the like. The braking ECU can control the braking force by controlling the braking mechanism based on a manipulation of the brake pedal made by the user. Furthermore, the braking ECU can control the braking force by controlling the braking mechanism based on instructions supplied from the vehicle control apparatus 12.

The steering apparatus (steering system) 28 includes a steering ECU (not shown in the drawings), i.e., an EPS (Electric Power Steering system) ECU, and a steering motor (not shown in the drawings). The steering ECU controls the orientation of the wheels (steered wheels) by controlling the steering motor based on a manipulation of the steering handle performed by the user. Furthermore, the steering ECU controls the orientation of the wheels by controlling the steering motor based on instructions supplied from the vehicle control apparatus 12. The steering may be performed by changing the torque distribution and the braking force distribution among the left and right wheels.

The pretensioner 29 increases the tensile force of seatbelts (not shown in the drawings) included in the vehicle 10, and further increases the effect of the seatbelts by securing the occupants to the seats.

The navigation apparatus 30 includes a GNSS (Global Navigation Satellite System) sensor (not shown in the drawings). Furthermore, the navigation apparatus 30 includes a computing section (not shown in the drawings) and a storage section (not shown in the drawings). The GNSS sensor detects the current position of the vehicle 10. The computing section reads map information corresponding to the current position detected by the GNSS sensor, from a map database stored in the storage section. The computing section determines a target route from the current position to a destination, using this map information.

The positioning section 33 includes a GNSS 48. The positioning section 33 further includes an IMU (Inertial Measurement Unit) 50 and a map database (map DB) 52. The positioning section 33 determines the position of the vehicle 10 using information acquired by the GNSS 48, information acquired by the IMU 50, and the map information stored in the map database 52.

The vehicle control apparatus 12 includes a computing section 54 and a storage section 56. The computing section 54 performs overall control of the vehicle control apparatus 12. The computing section 54 is formed by a CPU (Central Processing Unit), for example. The computing section 54 performs the vehicle control by controlling each section based on a program stored in the storage section 56.

The computing section 54 includes a control section 57, a travel control section 58, a limit value determining section 60, a braking control section 62, a notification control section 64, an operation control section 66, and a driving mode changing section 68. The control section 57, the travel control section 58, the limit value determining section 60, the braking control section 62, the notification control section 64, the operation control section 66, and the driving mode changing section 68 can be realized by having the computing section 54 execute a program stored in the storage section 56.

The storage section 56 includes a volatile memory (not shown in the drawings) and a non-volatile memory (not shown in the drawings). The volatile memory can be a RAM (Random Access Memory) or the like, for example. The non-volatile memory can be a ROM (Read Only Memory), a flash memory, or the like, for example. Programs, tables, maps, and the like are stored in the non-volatile memory, for example.

The vehicle 10 has a plurality of driving modes. The plurality of driving modes can include a first driving mode, a second driving mode, and a third driving mode. The second driving mode is a driving mode with a higher degree of automation than the first driving mode. In other words, the second driving mode is a driving mode in which the burden imposed on the driver is lighter than in the first driving mode, that is, a driving mode in which fewer tasks are demanded of the driver than in the first driving mode. The third driving mode is a driving mode with a higher degree of automation than the second driving mode. In other words, the third driving mode is a driving mode in which the burden imposed on the driver is lighter than in the second driving mode, that is, a driving mode in which fewer tasks are demanded of the driver than in the second driving mode. The burden imposed on the driver is at least one of a burden relating to monitoring the area surrounding the vehicle 10 and a burden relating to steering the vehicle 10.

The first driving mode corresponds to category A of level 2 automated driving, i.e., L2A, but is not limited to this. The second driving mode corresponds to category B of level 2 automated driving, i.e., L2B, but is not limited to this. The third driving mode corresponds to level 3 automated driving, i.e., L3, but is not limited to this.

In each of the first driving mode, the second driving mode, and the third driving mode, the acceleration, deceleration, and steering can be controlled by the vehicle control apparatus 12. Furthermore, in each of the first driving mode, the second driving mode, and the third driving mode, the responsibility for driving resides with the driver.

FIG. 2 is a diagram showing each automated driving level. As shown in FIG. 2, in the first driving mode and the second driving mode, the driving manipulations are performed by the driver and the system, i.e., the driver and the vehicle control apparatus 12. On the other hand, in the third driving mode, the driving manipulations are performed by the system, i.e., the vehicle control apparatus 12.

As shown in FIG. 2, in the first driving mode and the second driving mode, the driver has the responsibility of monitoring the surrounding environment of the vehicle 10. On the other hand, in the third driving mode, the driver does not have the responsibility of monitoring the surrounding environment of the vehicle 10.

As shown in FIG. 2, in the first driving mode, the driver must be capable of starting a driving manipulation immediately or within a relatively short time by using the steering wheel or the like. On the other hand, in the second driving mode and the third driving mode, the driver does not need to be capable of starting a driving manipulation immediately or within a relatively short time by using the steering wheel or the like. In other words, in the second driving mode and the third driving mode, it is allowable for the driver not to grip the steering wheel.

The third driving mode can be implemented under certain conditions, such as when travelling at a constant speed in a traffic jam, for example.

In the second driving mode, a request to grip the steering wheel can be issued from the vehicle control apparatus 12 as necessary. In other words, in the second driving mode, a hands-on request can be issued from the vehicle control apparatus 12 as necessary.

In the third driving mode, a request for a driving switch can be issued from the vehicle control apparatus 12 as necessary.

The control section 57 performs overall control of the vehicle control apparatus 12. The control section 57 can determine whether the vehicle 10 is currently travelling, based on the information supplied from the vehicle velocity sensor, for example.

A vicinity information acquiring section 59 can acquire vicinity information of the vehicle 10. The vicinity information can be supplied from the outside sensor 14 and the like, for example, as described above.

Figure 3:
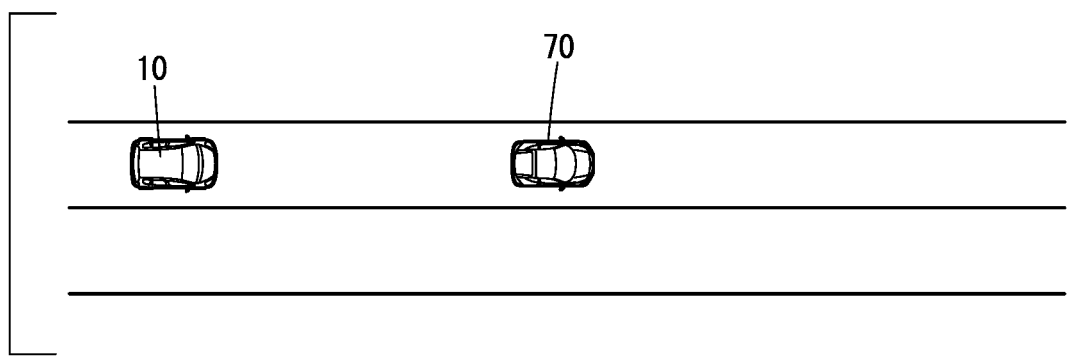
FIG. 3 is a diagram showing an example of travel control.

The travel control section 58 can perform travel control of the vehicle 10. More specifically, the travel control section 58 can perform travel control of the vehicle 10 based on the vicinity information. The travel control section 58 can also perform control causing the vehicle 10 to travel while following the preceding vehicle 70, i.e., following travel control. FIG. 3 is a diagram showing an example of travel control. An example of a case where following travel is performed is shown in FIG. 3. The travel control section 58 can perform control causing the vehicle 10 to follow the preceding vehicle 70 detected using the outside sensor 14 and the like.

The limit value determining section 60 can determine a deceleration limit value, which is a limit value for deceleration when the travel control is performed by the travel control section 58, according to the driving mode. FIG. 4 is a diagram showing an example of deceleration limit values. As shown in FIG. 4, when the vehicle 10 is being driven in the first driving mode, the limit value determining section 60 can set the deceleration limit value to be a first limit value. When the vehicle 10 is being driven in the second driving mode, the limit value determining section 60 can set the deceleration limit value to be a second limit value. When the vehicle 10 is being driven in the third driving mode, the limit value determining section 60 can set the deceleration limit value to be a third limit value. The second limit value is higher than the first limit value. The first limit value is 0.6 G, for example, but is not limited to this. The second limit value is 1.0 G, for example, but is not limited to this. The third limit value is higher than the first limit value. The third limit value is 1.0 G, for example, but is not limited to this. Here, an example is described of a case in which the second limit value and the third limit value are set to be equal, but the present invention is not limited to this.

As shown in FIG. 4, when the vehicle 10 is being driven in the second driving mode and the travel velocity of the vehicle 10 is less than a velocity threshold value, the limit value determining section 60 can determine the deceleration limit value to be the second limit value. More specifically, when the vehicle 10 is being driven in the second driving mode and the travel velocity of the vehicle 10 is from 0 km/h to 50 km/h, the limit value determining section 60 can determine the deceleration limit value to be 1.0 G, for example. When the vehicle 10 is being driven in the second driving mode and the travel velocity of the vehicle 10 is greater than or equal to the velocity threshold value, the limit value determining section 60 can determine the deceleration limit value to be a fourth limit value that is lower than the second limit value. More specifically, when the vehicle 10 is being driven in the second driving mode and the travel velocity of the vehicle 10 is from 60 km/h to 120 km/h, the limit value determining section 60 can determine the deceleration limit value to be 0.3 G, for example. Here, an example is described of a case in which the fourth limit value is 0.3 G, but the fourth limit value is not limited to this. As an example, the fourth limit value may be equal to the first limit value. In a case where the driving mode of the vehicle 10 is none of the first to third driving modes, a predetermined prescribed limit value is determined as the deceleration limit value.

As shown in FIG. 4, in the vehicle control apparatus 12 of the reference example, in each of the first driving mode, the second driving mode, and the third driving mode, for a vehicle velocity range from 0 km/h to 50 km/h, the deceleration limit value is set uniformly to be 0.6 G. In contrast to this, in the present embodiment, the deceleration limit value is set as shown below. That is, in the second driving mode and the third driving mode, for a vehicle velocity range from 0 km/h to 50 km/h, the deceleration limit value is set to a relatively large value of 1.0 G, but in the first driving mode, the deceleration limit value is set to a relatively small value of 0.6 G. In this way, in the present embodiment, since the deceleration limit value is set to a suitable value according to the driving mode, it is possible to realize more accurate braking control according to the driving mode. That is, in the present embodiment, since the deceleration limit value is more relaxed in driving modes that have a high degree of automation, it is possible to increase cases where it is possible to avoid a collision in a driving mode that has a high degree of automation.

Figure 5:
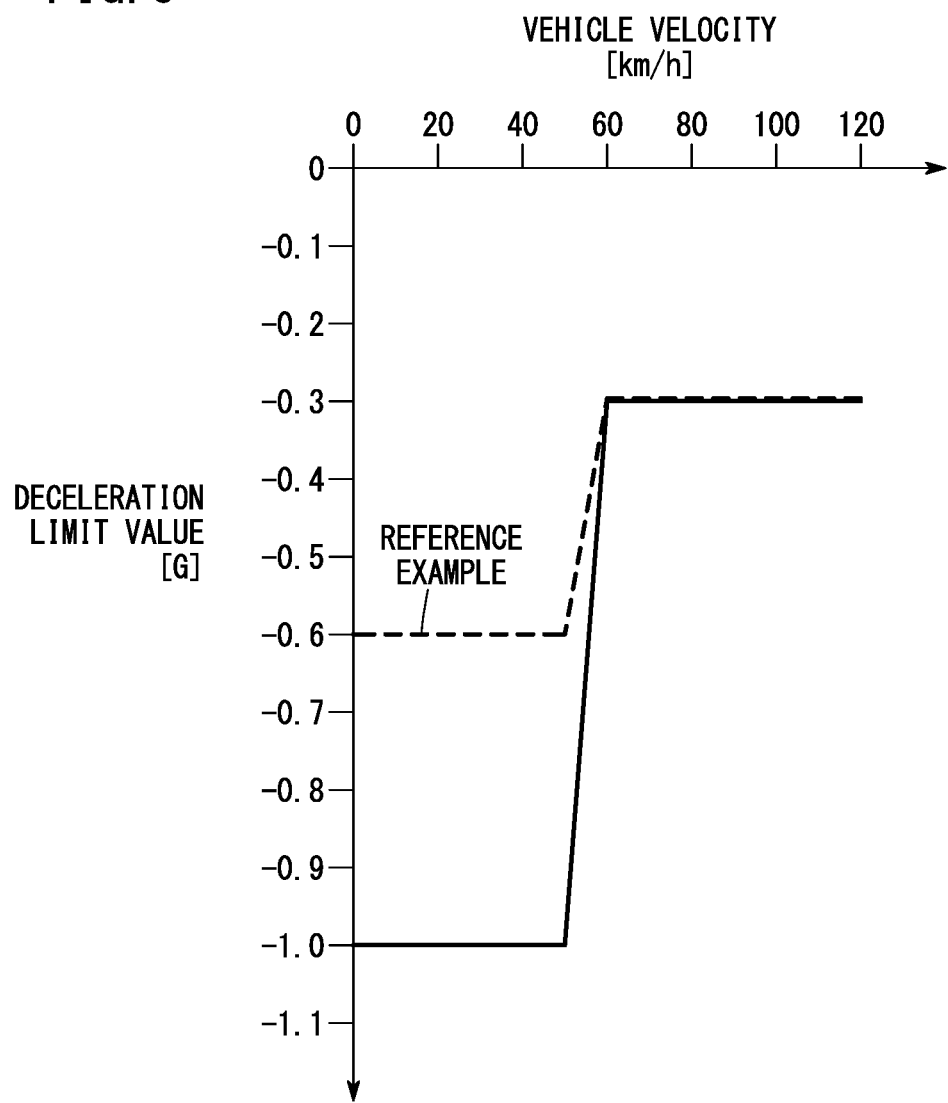
FIG. 5 is a graph showing an example of deceleration limit values.

FIG. 5 is a graph showing examples of deceleration limit values. In FIG. 5, the horizontal axis indicates the vehicle velocity, and the vertical axis indicates the deceleration limit value. Deceleration limit values in the second driving mode are shown in FIG. 5. The dashed line indicates the case of the reference example, and the solid line indicates the case of the present embodiment.

The braking control section 62 can perform braking control based on the vicinity information, such that the vehicle 10 decelerates with a deceleration that does not exceed the deceleration limit value determined by the limit value determining section 60. For example, in a case where the vicinity information indicates the presence of an obstacle in front of the vehicle 10, the braking control section 62 can perform the braking control such that the vehicle 10 decelerates with deceleration that does not exceed the deceleration limit value determined by the limit value determining section 60. Furthermore, in a case where a braking apparatus (not shown in the drawings) included in the preceding vehicle 70 has operated, the vicinity information indicates that the travel velocity of this preceding vehicle 70 has decreased. In such a case, the braking control section 62 can perform the braking control such that the vehicle 10 decelerates with deceleration that does not exceed the deceleration limit value determined by the limit value determining section 60.

It is also possible for a situation in which it is necessary to decelerate the vehicle 10 with a deceleration exceeding the deceleration limit value determined by the limit value determining section 60. In a case where the deceleration of the vehicle 10 exceeds the deceleration limit value determined by the limit value determining section 60, the notification control section 64 can perform control to issue a warning to the driver. This warning can be issued via the HMI 22, for example.

In a case where the deceleration of the vehicle 10 begins to decrease after having exceeded the deceleration limit value determined by the limit value determining section 60, the notification control section 64 may perform control such as described below. That is, in such a case, the notification control section 64 may perform control to stop this warning and also perform control to issue a driving switch request to the driver.

In a case where the deceleration of the vehicle 10 has become less than the deceleration limit value set by the limit value determining section 60 after having exceeded the deceleration limit value, the notification control section 64 may perform control such as described below. That is, in such a case, the notification control section 64 may perform control to stop this warning and also perform control to issue a driving switch request to the driver.

When the deceleration of the vehicle 10 exceeds the deceleration limit value determined by the limit value determining section 60, the notification control section 64 may perform control to issue a driving switch request to the driver.

The operation control section 66 can control the operation of the pretensioner 29. When the deceleration of the vehicle 10 exceeds the deceleration limit value determined by the limit value determining section 60, the operation control section 66 may cause the pretensioner 29 to operate.

The driving mode changing section 68 can change the driving mode. When a driving switch request is accepted by the driver, the driving mode changing section 68 changes the driving mode of the vehicle 10.

Figure 6:
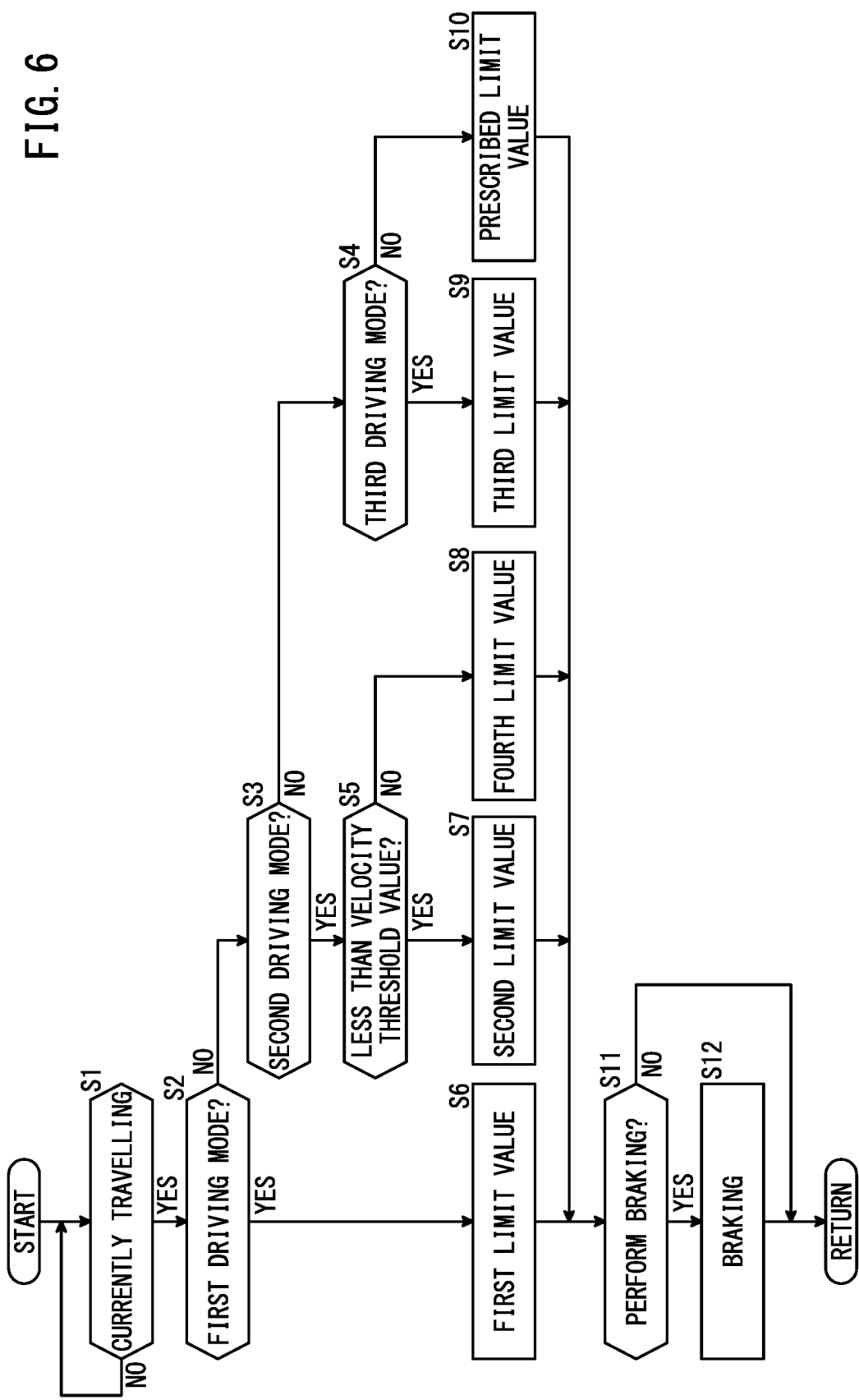
FIG. 6 is a flow chart showing an example of an operation of the vehicle control apparatus according to an embodiment.

An example of the operation of the vehicle control apparatus 12 according to the present embodiment is described using FIG. 6. FIG. 6 is a flow chart showing an example of the operation of the vehicle control apparatus according to the present embodiment. An example of determining the deceleration limit value according to the driving mode is shown in FIG. 6. At step S1, the control section 57 judges whether the vehicle 10 is currently travelling. If the vehicle 10 is currently traveling (YES at step S1), the process moves to step S2. If the vehicle 10 is not currently travelling (NO at step S1), step S1 is repeated.

At step S2, the limit value determining section 60 judges whether the driving mode of the vehicle 10 is set to the first driving mode. If the driving mode of the vehicle 10 is set to the first driving mode (YES at step S2), the process moves to step S6. If the driving mode of the vehicle 10 is set to a driving mode other than the first driving mode (NO at step S2), the process moves to step S3.

At step S3, the limit value determining section 60 judges whether the driving mode of the vehicle 10 is set to the second driving mode. If the driving mode of the vehicle 10 is set to the second driving mode (YES at step S3), the process moves to step S5. If the driving mode of the vehicle 10 is set to a driving mode other than the second driving mode (NO at step S3), the process moves to step S4.

At step S4, the limit value determining section 60 judges whether the driving mode of the vehicle 10 is set to the third driving mode. If the driving mode of the vehicle 10 is set to the third driving mode (YES at step S4), the process moves to step S9. If the driving mode of the vehicle 10 is set to a driving mode other than the third driving mode (NO at step S4), the process moves to step S10.

At step S5, the limit value determining section 60 judges whether the travel velocity of the vehicle 10 is less than the velocity threshold value. If the travel velocity of the vehicle 10 is less than the velocity threshold value (YES at step S5), the process moves to step S7. If the travel velocity of the vehicle 10 is greater than or equal to the velocity threshold value (NO at step S5), the process moves to step S8.

At step S6, the limit value determining section 60 determines the deceleration limit value to be the first limit value. After this, the process moves to step S11.

At step S7, the limit value determining section 60 determines the deceleration limit value to be the second limit value. After this, the process moves to step S11.

At step S8, the limit value determining section 60 determines the deceleration limit value to be the fourth limit value. After this, the process moves to step S11.

At step S9, the limit value determining section 60 determines the deceleration limit value to be the third limit value. After this, the process moves to step S11.

At step S10, the limit value determining section 60 determines the predetermined prescribed limit value as the deceleration limit value. After this, the process moves to step S11.

At step S11, the braking control section 62 determines whether to perform braking of the vehicle 10. For example, if the vicinity information indicates that there is an obstacle in front of the vehicle 10, the braking control section 62 can determine that braking of the vehicle 10 is to be performed. On the other hand, if the vicinity information indicates that there is no obstacle in front of the vehicle 10, the braking control section 62 can determine that braking of the vehicle 10 is not to be performed. Furthermore, if the vicinity information indicates that the travel velocity of the preceding vehicle 70 has decreased, the braking control section 62 can determine that braking of the vehicle 10 is to be performed. On the other hand, if the vicinity information indicates that the travel velocity of the preceding vehicle 70 has not changed, the braking control section 62 can determine that braking of the vehicle 10 is not to be performed. If braking of the vehicle 10 is to be performed (YES at step S11), the process moves to step S12. If braking of the vehicle 10 is not to be performed (NO at step S11), the process shown in FIG. 6 ends.

At step S12, the braking control section 62 performs braking control based on the vicinity information, such that the vehicle 10 decelerates with a deceleration that does not exceed the deceleration limit value determined by the limit value determining section 60. After this, the process shown in FIG. 6 ends.

Figure 7:
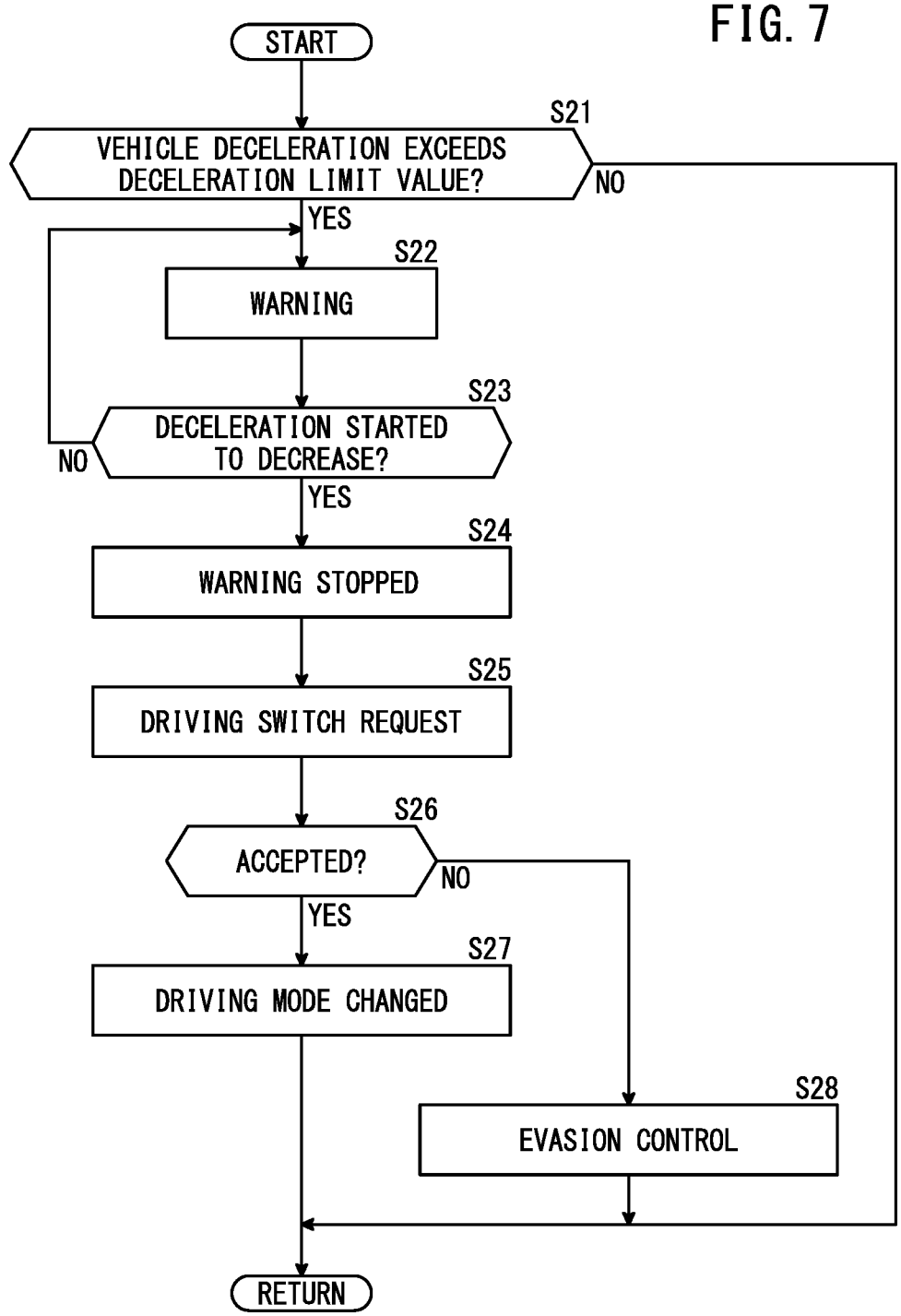
FIG. 7 is a flow chart showing an example of an operation of the vehicle control apparatus according to an embodiment.

An example of the operation of the vehicle control apparatus 12 according to the present embodiment is described using FIG. 7. FIG. 7 is a flow chart showing an example of the operation of the vehicle control apparatus according to the present embodiment. An example of the operation in a case where the vehicle 10 decelerates with a deceleration that exceeds the deceleration limit value determined by the limit value determining section 60 is shown in FIG. 7.

At step s21, the control section 57 judges whether the deceleration of the vehicle 10 exceeds the deceleration limit value determined by the limit value determining section 60. If the deceleration of the vehicle 10 exceeds the deceleration limit value determined by the limit value determining section 60 (YES at step S21), the process moves to step S22. If the deceleration of the vehicle 10 does not exceed the deceleration limit value determined by the limit value determining section 60 (NO at step S21), the process shown in FIG. 7 ends.

At step S22, the notification control section 64 performs control to issue a warning to the driver. After this, the process moves to step S23.

At step S23, the control section 57 judges whether the deceleration of the vehicle 10 has started to decrease. If the deceleration of the vehicle 10 has started to decrease (YES at step S23), the process moves to step S24. If the deceleration of the vehicle 10 has not started to decrease (NO at step S23), the processing from step S22 onward is repeated.

At step S24, the notification control section 64 performs control to stop the warning issued to the driver. After this, the process moves to step S25.

At step S25, the notification control section 64 performs control to issue a driving switch request to the driver. After this, the process moves to step S26.

At step S26, the control section 57 judges whether the driving switch has been accepted by the driver. If the driving switch has been accepted by the driver (YES at step S26), the process moves to step S27. If the driving switch has not been accepted by the driver (NO at step S26), the process moves to step S28.

At step S27, the driving mode changing section 68 changes the driving mode of the vehicle 10. Specifically, the driving mode changing section 68 changes the driving mode of the vehicle 10 to a mode with a lower degree of automation. Also, the driving mode changing section 68 may change the driving mode to a manual driving mode.

At step S28, the control section 57 performs evasion control, which is control causing the vehicle 10 to perform an evasive maneuver. Such evasion control is referred to as an MRM (Minimal Risk Maneuver). In the evasion control, the control section 57 safely stops the vehicle 10 automatically while issuing a warning around the vehicle 10 and maintaining or changing lanes. After this, the process shown in FIG. 7 ends.

Figure 8:
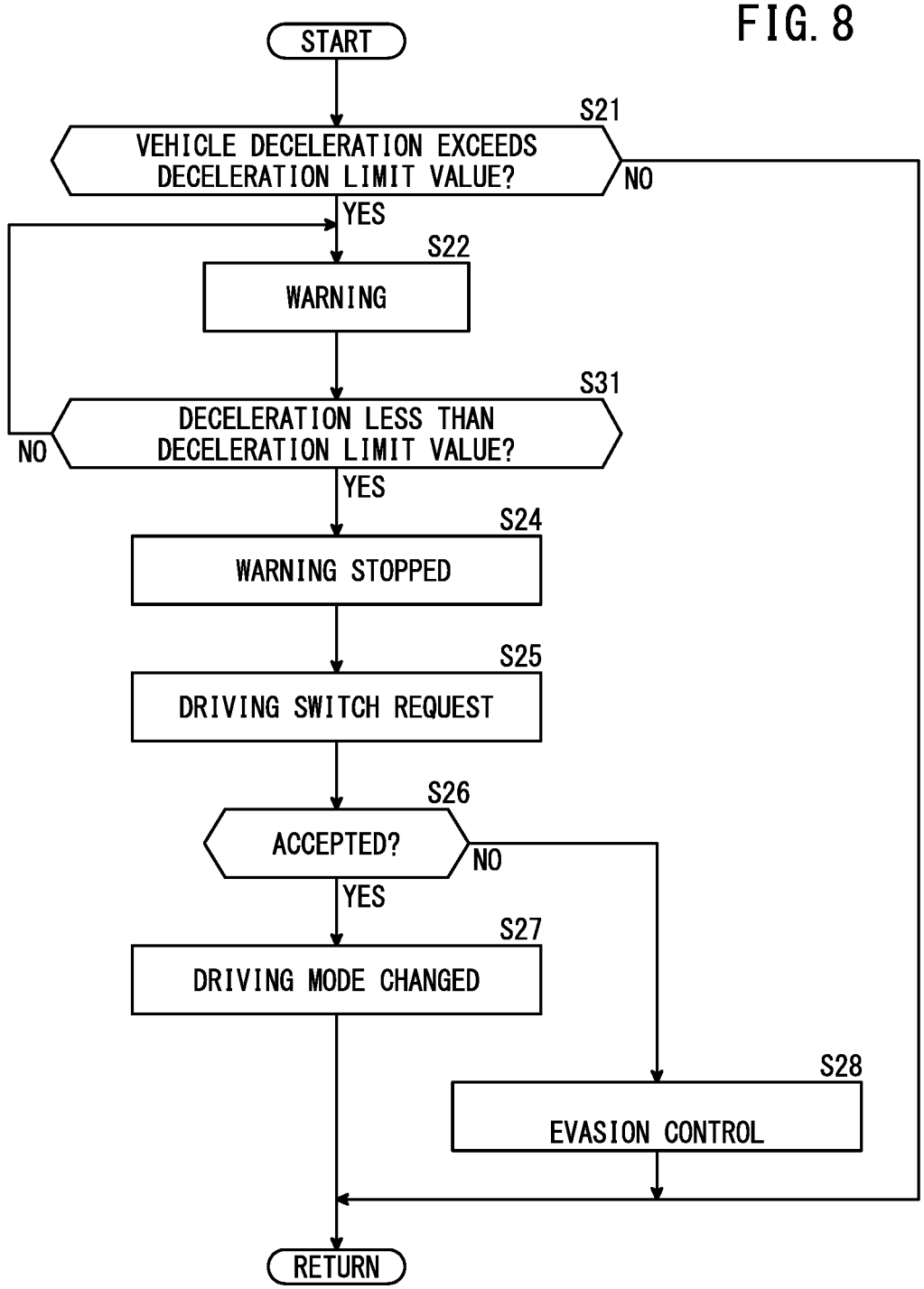
FIG. 8 is a flow chart showing an example of an operation of the vehicle control apparatus according to an embodiment.

An example of the operation of the vehicle control apparatus 12 according to the present embodiment is described using FIG. 8. FIG. 8 is a flow chart showing an example of the operation of the vehicle control apparatus according to the present embodiment. Another example of the operation in a case where the vehicle 10 decelerates with a deceleration that exceeds the deceleration limit amount determined by the limit value determining section 60 is shown in FIG. 8.

Steps S21 and S22 are the same as steps S21 and S22 described above using FIG. 7, and therefore descriptions thereof are omitted. After step S22 is completed, the process moves to step S31.

At step S31, the control section 57 judges whether the deceleration of the vehicle 10 is less than the deceleration limit amount. If the deceleration of the vehicle 10 is less than the deceleration limit amount (YES at step S31), the process moves to step S24. If the deceleration of the vehicle 10 is not less than the deceleration limit amount (NO at step S31), the processing from step S22 onward is repeated.

Steps S24 to S28 are the same as steps S24 to S28 described above using FIG. 7, and therefore descriptions thereof are omitted. After this, the process shown in FIG. 8 ends.

Figure 9:
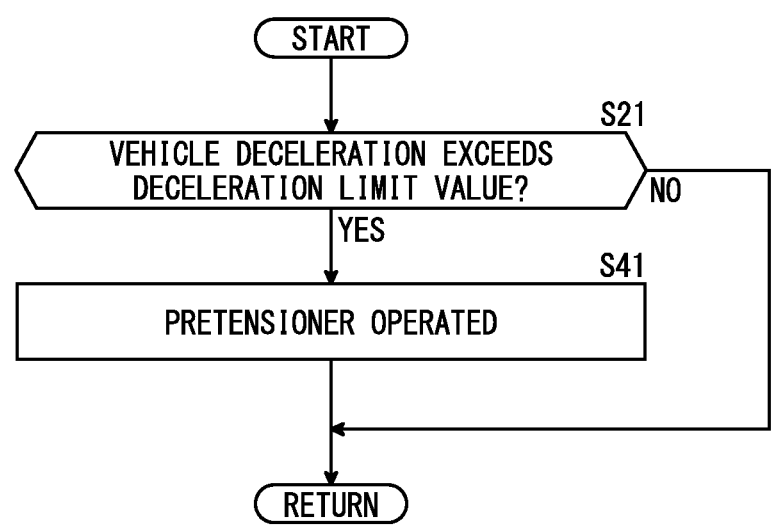
FIG. 9 is a flow chart showing an example of an operation of the vehicle control apparatus according to an embodiment.

An example of the operation of the vehicle control apparatus 12 according to the present embodiment is described using FIG. 9. FIG. 9 is a flow chart showing an example of the operation of the vehicle control apparatus according to the present embodiment. Yet another example of the operation in a case where the vehicle 10 decelerates with a deceleration that exceeds the deceleration limit amount determined by the limit value determining section 60 is shown in FIG. 9.

Step S21 is the same as step S21 described above using FIG. 7, and therefore a description thereof is omitted. If the deceleration of the vehicle 10 exceeds the deceleration limit value determined by the limit value determining section 60 (YES at step S21), the process moves to step S41. If the deceleration of the vehicle 10 does not exceed the deceleration limit value determined by the limit value determining section 60 (NO at step S21), the process shown in FIG. 9 ends.

At step S41, the operation control section 66 causes the pretensioner 29 to operate. After this, the process shown in FIG. 9 ends.

The operations described above using FIGS. 7 to 9 may be suitably combined.

In this way, according to the present embodiment, the deceleration limit value, which is a limit value of the deceleration used when travel control is performed by the travel control section 58, is determined according to the driving mode. The deceleration limit value is set to the first limit value when the vehicle 10 is being driven in the first driving mode, and the deceleration limit value is set to a second limit value, which is different from the first limit value, when the vehicle 10 is being driven in the second driving mode. Since the deceleration limit value is accurately set according to the driving mode, according to the present embodiment, it is possible to realize accurate braking control according to the driving mode. That is, with the present embodiment, since the deceleration limit value is more relaxed in driving modes having a high degree of automation, it is possible to increase cases where it is possible to avoid a collision in a driving mode with a high degree of automation.

Preferred embodiments of the present invention are described above, but the present invention is not limited to the above-described embodiments, and various modifications could be adopted therein without departing from the scope of the present invention.

The embodiments described above can be summarized as shown below.

The vehicle control apparatus (12) is an apparatus that controls the vehicle (10) having a plurality of driving modes and includes the vicinity information acquiring section (59) that acquires vicinity information of the vehicle; the travel control section (58) that performs travel control of the vehicle based on the vicinity information; the limit value determining section (60) that determines a deceleration limit value, which is a limit value for deceleration when the travel control is performed, according to the driving mode; and the braking control section (62) that performs braking control based on the vicinity information, such that the vehicle decelerates with a deceleration that does not exceed the determined deceleration limit value; wherein the limit value determining section sets the deceleration limit value to a first limit value when the vehicle is driven in the first driving mode (L2A) among the plurality of driving modes, and sets the deceleration limit value to a second limit value, which is higher than the first limit value, when the vehicle is driven in the second driving mode (L2B) that has a higher degree of automation than the first driving mode. According to such a configuration, the deceleration limit value is set to the first limit value when the vehicle is being driven in the first mode, and the deceleration limit value is set to the second limit value, which is higher than the first limit value, when the vehicle is being driven in the second driving mode. Therefore, according to such a configuration, it is possible to realize accurate braking control according to the driving mode. In other words, according to such a configuration, since the deceleration limit value is relaxed in a driving mode that has a high degree of automation, it is possible to increases the cases where it is possible to avoid a collision in driving modes with a high degree of automation.

When the vehicle is being driven in the third driving mode (L3) that has a higher degree of automation than the second driving mode, the limit value determining section may set the deceleration limit value to a third limit value that is higher than the first limit value. According to such a configuration, in the third driving mode, it is possible to improve safety to a greater degree than in the first driving mode.

The third limit value may be equal to the second limit value.

When the vehicle is being driven in the second driving mode and a travel velocity of the vehicle is less than a velocity threshold value, the limit value determining section may determine the deceleration limit value to be the second limit value; and when the vehicle is being driven in the second driving mode and the travel velocity of the vehicle is greater than or equal to the velocity threshold value, the limit value determining section may determine the deceleration limit value to be a fourth limit value that is lower than the second limit value. According to such a configuration, it is possible to realize accurate braking control according to the travel velocity of the vehicle.

The fourth limit value may be equal to the first limit value.

The vehicle control apparatus may further include the notification control section (64) that, when the deceleration of the vehicle exceeds the deceleration limit value, performs control to issue a warning to the driver. According to such a configuration, the safety can be further improved.

When the deceleration of the vehicle starts to drop after having exceeded the deceleration velocity limit, or when the deceleration of the vehicle becomes less than the deceleration limit value after having exceeded the deceleration limit value, the notification control section may perform control to stop the warning and control to issue a driving switch request to the driver. According to such a configuration, the driving switch can be performed smoothly, and therefore the safety can be further improved.

The vehicle control apparatus may further include a notification control section that, when the deceleration of the vehicle exceeds the deceleration limit value, performs control to issue a driving switch request to the driver. According to such a configuration, the driving switch can be performed smoothly, and therefore the safety can be further improved.

The vehicle control apparatus may further include the operation control section (66) that, when the deceleration of the vehicle exceeds the deceleration limit value, causes the pretensioner (29) to operate to increase a tensile force of a seatbelt included in the vehicle. According to such a configuration, the safety can be further improved.

The vehicle control apparatus may further include the driving mode changing section (68) that, when the driving switch request is accepted by the driver, changes the driving mode of the vehicle.

The vehicle includes the vehicle control apparatus described above.

The vehicle control method, for controlling the vehicle that has a plurality of driving modes, includes the travel control step (S1) of performing travel control of the vehicle based on vicinity information; the limit value determining step (S2 to S10) of determining a deceleration limit value, which is a limit value for deceleration when the travel control is performed, according to the driving mode; and the braking step (S12) of performing braking control based on the vicinity information, such that the vehicle decelerates with a deceleration that does not exceed the deceleration limit value determined in the limit value determining step; wherein, in the limit value determining step, the deceleration limit value is set to the first limit value when the vehicle is driven in a first driving mode among the plurality of driving modes, and the deceleration limit value is set to the second limit value, which is higher than the first limit value, when the vehicle is driven in a second driving mode that has a higher degree of automation than the first driving mode.

What is claimed is:

1. A vehicle control apparatus that controls a vehicle having a plurality of driving modes, the vehicle control apparatus comprising one or more processors that execute computer-executable instructions stored in a memory,
    wherein the one or more processors execute the computer-executable instructions to cause the vehicle control apparatus to:
        acquire vicinity information of the vehicle;
        perform travel control of the vehicle based on the vicinity information;
        determine a deceleration limit value, which is a limit value for deceleration when the travel control is performed, according to the driving mode;
        perform braking control based on the vicinity information, in a manner that the vehicle decelerates with a deceleration that does not exceed the determined deceleration limit value; and
        set the deceleration limit value to a first limit value when the vehicle is driven in a first driving mode among the plurality of driving modes, and set the deceleration limit value to a second limit value, which is higher than the first limit value, when the vehicle is driven in a second driving mode that has a higher degree of automation than the first driving mode,
    wherein when the deceleration of the vehicle exceeds the deceleration limit value, the one or more processors cause the vehicle control apparatus to perform control to issue a warning to a driver of the vehicle, and
    wherein when the deceleration of the vehicle starts to drop after having exceeded the deceleration velocity limit, or when the deceleration of the vehicle becomes less than the deceleration limit value after having exceeded the deceleration limit value, the one or more processors cause the vehicle control apparatus to perform control to stop the warning and control to issue a driving switch request to the driver.

2. The vehicle control apparatus according to claim 1, wherein when the vehicle is being driven in a third driving mode that has a higher degree of automation than the second driving mode, the one or more processors cause the vehicle control apparatus to set the deceleration limit value to a third limit value that is higher than the first limit value.

3. The vehicle control apparatus according to claim 2, wherein the third limit value is equal to the second limit value.

4. The vehicle control apparatus according to claim 1, wherein:
    when the vehicle is being driven in the second driving mode and a travel velocity of the vehicle is less than a velocity threshold value, the one or more processors cause the vehicle control apparatus to determine the deceleration limit value to be the second limit value; and when the vehicle is being driven in the second driving mode and the travel velocity of the vehicle is greater than or equal to the velocity threshold value, the one or more processors cause the vehicle control apparatus to determine the deceleration limit value to be a fourth limit value that is lower than the second limit value.

5. The vehicle control apparatus according to claim 4, wherein the fourth limit value is equal to the first limit value.

6. The vehicle control apparatus according to claim 1, wherein when the deceleration of the vehicle exceeds the deceleration limit value, the one or more processors cause the vehicle control apparatus to have a pretensioner operate to increase a tensile force of a seatbelt included in the vehicle.

7. The vehicle control apparatus according to claim 1, wherein when the driving switch request is accepted by the driver, the one or more processors cause the vehicle control apparatus to change the driving mode of the vehicle.

8. A vehicle comprising the vehicle control apparatus of claim 1.

9. A vehicle control apparatus that controls a vehicle having a plurality of driving modes, the vehicle control apparatus comprising one or more processors that execute computer-executable instructions stored in a memory, wherein the one or more processors execute the computer-executable instructions to cause the vehicle control apparatus to:

acquire vicinity information of the vehicle;

perform travel control of the vehicle based on the vicinity information;

determine a deceleration limit value, which is a limit value for deceleration when the travel control is performed, according to the driving mode;

perform braking control based on the vicinity information, in a manner that the vehicle decelerates with a deceleration that does not exceed the determined deceleration limit value; and set the deceleration limit value to a first limit value when the vehicle is driven in a first driving mode among the plurality of driving modes, and set the deceleration limit value to a second limit value, which is higher than the first limit value, when the vehicle is driven in a second driving mode that has a higher degree of automation than the first driving mode, wherein when the deceleration of the vehicle exceeds the deceleration limit value, the one or more processors cause the vehicle control apparatus to perform control to issue a driving switch request to a driver of the vehicle.

10. A vehicle control method for controlling a vehicle that has a plurality of driving modes, comprising:

performing travel control of the vehicle based on vicinity information;

determining a deceleration limit value, which is a limit value for deceleration when the travel control is performed, according to the driving mode;

performing braking control based on the vicinity information, in a manner that the vehicle decelerates with a deceleration that does not exceed the determined deceleration limit value; and when determining the deceleration limit value, setting the deceleration limit value to a first limit value when the vehicle is driven in a first driving mode among the plurality of driving modes, and setting the deceleration limit value to a second limit value, which is higher than the first limit value, when the vehicle is driven in a second driving mode that has a higher degree of automation than the first driving mode, wherein when the deceleration of the vehicle exceeds the deceleration limit value, the method further comprises issuing a warning to a driver of the vehicle, and wherein when the deceleration of the vehicle starts to drop after having exceeded the deceleration velocity limit, or when the deceleration of the vehicle becomes less than the deceleration limit value after having exceeded the deceleration limit value, the method further comprises stopping the warning and issuing a driving switch request to the driver.

* * * * *